United States Patent
Li et al.

(10) Patent No.: US 7,978,223 B2
(45) Date of Patent: Jul. 12, 2011

(54) IMAGE CAPTURING APPARATUS WITH SUPPRESSION OF IMAGE BLUR AND METHOD THEREOF FOR SUPPRESSING IMAGE BLUR

(75) Inventors: Yun-Chin Li, Banciao (TW); Chin-Lung Yang, Toufen Township, Miaoli County (TW); Shih-Chang Han, Taipei (TW)

(73) Assignee: Altek Corporation, Hsinchu (TW)

( * ) Notice: Subject to any disclaimer, the term of this patent is extended or adjusted under 35 U.S.C. 154(b) by 561 days.

(21) Appl. No.: 12/216,655

(22) Filed: Jul. 9, 2008

(65) Prior Publication Data

US 2009/0123141 A1    May 14, 2009

(30) Foreign Application Priority Data

Nov. 9, 2007    (TW) ................................ 96142527 A

(51) Int. Cl.
*H04N 5/228* (2006.01)
*G03B 17/00* (2006.01)

(52) U.S. Cl. ............. 348/208.99; 348/208.1; 348/208.2; 348/208.3; 348/208.4; 348/208.12; 396/55

(58) Field of Classification Search ............. 348/208.99, 348/208.1, 208.2, 208.4, 208.12, 208.13; 396/55

See application file for complete search history.

(56) References Cited

U.S. PATENT DOCUMENTS

| | | | |
|---|---|---|---|
| 2002/0027600 A1* | 3/2002 | Yamanaka et al. | 348/208 |
| 2005/0057660 A1* | 3/2005 | Nonaka et al. | 348/208.99 |
| 2006/0140507 A1* | 6/2006 | Ohki | 382/276 |
| 2007/0242936 A1* | 10/2007 | Chujo et al. | 396/55 |
| 2009/0087173 A1* | 4/2009 | Li et al. | 396/55 |
| 2009/0103910 A1* | 4/2009 | Li et al. | 396/55 |

* cited by examiner

*Primary Examiner* — Sinh Tran
*Assistant Examiner* — Selam Gebriel
(74) *Attorney, Agent, or Firm* — Rosenberg, Klein & Lee

(57) ABSTRACT

A method for suppression of image blur is applied to an image capturing apparatus in a photography mode whose exposure time is set to be greater than a safe exposure time. The method comprising the following steps: capturing a long exposure image with the present exposure time, and a short exposure image with an exposure time smaller than or equal to the safe exposure time in the same landscape. Besides, obtain a locus signal in the process of long exposure image capture. Afterwards, execute an arithmetic procedure to smooth the short exposure image, and then produce a point scale image using the auxiliary arithmetic of locus signal. Finally, process the long exposure image and the point scale image with multiplication arithmetic to restore the long exposure image, thus forming an output image.

16 Claims, 2 Drawing Sheets

IMAGE CAPTURING APPARATUS WITH SUPPRESSION OF IMAGE BLUR AND METHOD THEREOF FOR SUPPRESSING IMAGE BLUR

BACKGROUND OF THE INVENTION

1. Field of the Invention

The present invention relates to an image capturing apparatus; in particular, to an image capturing apparatus with suppression of image blur and method thereof for suppression of image blur under long exposure time.

2. Description of Related Art

As digital camera technology develops rapidly and extensively, people nowadays pay more and more attention to technologies for suppressing the problem caused by involuntary hand movements (handshake) which may result in blurred images. Currently, technologies for anti-handshake can be generally categorized into two types of mechanisms: optical detector mechanism and software compensation mechanism, respectively.

The principle of optical detector mechanism is to perform process on lens and charge-coupled devices (CCD's), wherein it controls the correction of lens or CCD's through the detection result of a shake detector, so as to compensate the shake caused by the camera itself. In terms of lens control: it, by using the principle of lens floating, detects the shake shift by a shake detector, calculates the shift amount by a shake correcting component, then drives the lens for optical axle correction so as to keep the display stable. The advantage thereof lies in better image quality, but the effect of anti-handshake is not significant (since available space for lens floating is limited). On the other hand, for CCD control mechanism: it similarly employs a shake detector to detect the shake shift, and, by using the principle of mechanical support floating, cancels the image blur caused by handshake through adjusting the position correction of CCD's, in which the effect of anti-handshake thereof is better than the lens control approach, but such design may deteriorate the image quality; meanwhile, this type of anti-handshake mechanism needs to cooperate with CCD's consisting of more pixels to present its usability, otherwise the situation that image is stable but loose or blurred in quality may occur.

However, due to complexity in mechanism design and manufacture cost, the anti-handshake technology in the aforementioned optical detector mechanism is generally applied only to cameras of higher level. Whereas, for cameras of lower level, based on issues such as mechanism design complexity and manufacture cost, the optical detector mechanism is obviously not practical, hence the industry has developed the most commonly used software compensation mechanism (generally referred as electrical anti-handshake).

The essential principle of software compensation mechanism is that it uses a shake detector to record the track of moving or shaking in camera during photography, so as to provide information for performing image restoration process, which forms thus a type of post-process technology for single image formation in image capture of camera. But, the general post-process technology for single image may offer different image restoration quality under different degree of moving, and the image restoration quality obtained may be also affected by noise, leading to unsatisfactory practical effect of image restoration. Additionally, since the said post-process technology uses in general only estimated Point Spread Function (PSF) and the captured image blur to perform clear image restoration process, hence, due to very limited available resources, it needs to rely on complicated algorithm and long-time arithmetic calculations to restore a clearer image. Therefore, regarding to anti-handshake feature and effect in the currently available digital cameras, there is still much to be desired.

SUMMARY OF THE INVENTION

In view of the issues described supra, the technical problems that the present invention is directed to resolve is, through control improvement in firmware, and by using long exposure, short exposure as well as estimated Point Spread Function, to provide effective assistance in comparison and arithmetic operations, without having to significantly alter the hardware architecture in a digital camera. Thereby, the objective to perform image capture with long exposure so as to efficiently suppress image blur for facilitating restoration of image clarity image may be achieved.

To achieve the above-mentioned objective, one proposed solution in accordance with the present invention is to provide an image capturing apparatus with suppression of image blur, which performs image blur suppression in a photography mode whose exposure time is set to be greater than a safe exposure time, the said image capturing apparatus includes: an image capturing unit, a shake detector and a process unit. Therein the image capturing unit receives a capture signal to capture a first image with a present exposure time, and a second image with an exposure time being smaller than or equal to the safe exposure time. The shake detector is used to record a locus signal in the image capturing apparatus during the exposure time for the first image, while the process unit is used to generate the capture signal, executes an arithmetic procedure to smooth the second image, and further uses the auxiliary arithmetic operation of locus signal to build a Point Scale Image. Besides, the process unit may perform a specific arithmetic on the first image and the Point Scale Image, so as to restore and form an output image. Thus, in the photography mode whose exposure time is greater than the safe exposure time, it is possible to perform image blur suppression on the first image through the assistance of the second image, such that the output image is a clearer image of the first image.

To achieve the above-mentioned objective, another proposed solution in accordance with the present invention is to provide a method for suppression of image blur, which is applied to a photography mode whose exposure time is set to be greater than a safe exposure time, the said method includes the following steps: initially, capturing an image with the present exposure time, and a second image with an exposure time smaller than or equal to the safe exposure time, meanwhile recording the locus signal in the image capturing apparatus during the exposure time for the first image. Besides, executing an arithmetic procedure to smooth the second image, and further using the auxiliary arithmetic operation of locus signal to build a Point Scale Image. Finally, performing a specific arithmetic on the first image and the Point Scale Image, so as to restore and form an output image. Thus, in the photography mode whose exposure time is greater than the safe exposure time, it is possible to perform image blur suppression on the first image through the assistance of the second image, such that the output image is a clearer image of the first image.

The above-mentioned summary as well as subsequent descriptions and drawings are both for further illustrating the measures, means and effects taken by the present invention to achieve the prescribed objectives. Other goals and advantages of the present invention will be explained in details in the following descriptions and drawings.

DETAILED DESCRIPTION OF THE PREFERRED EMBODIMENTS

Figure 1:
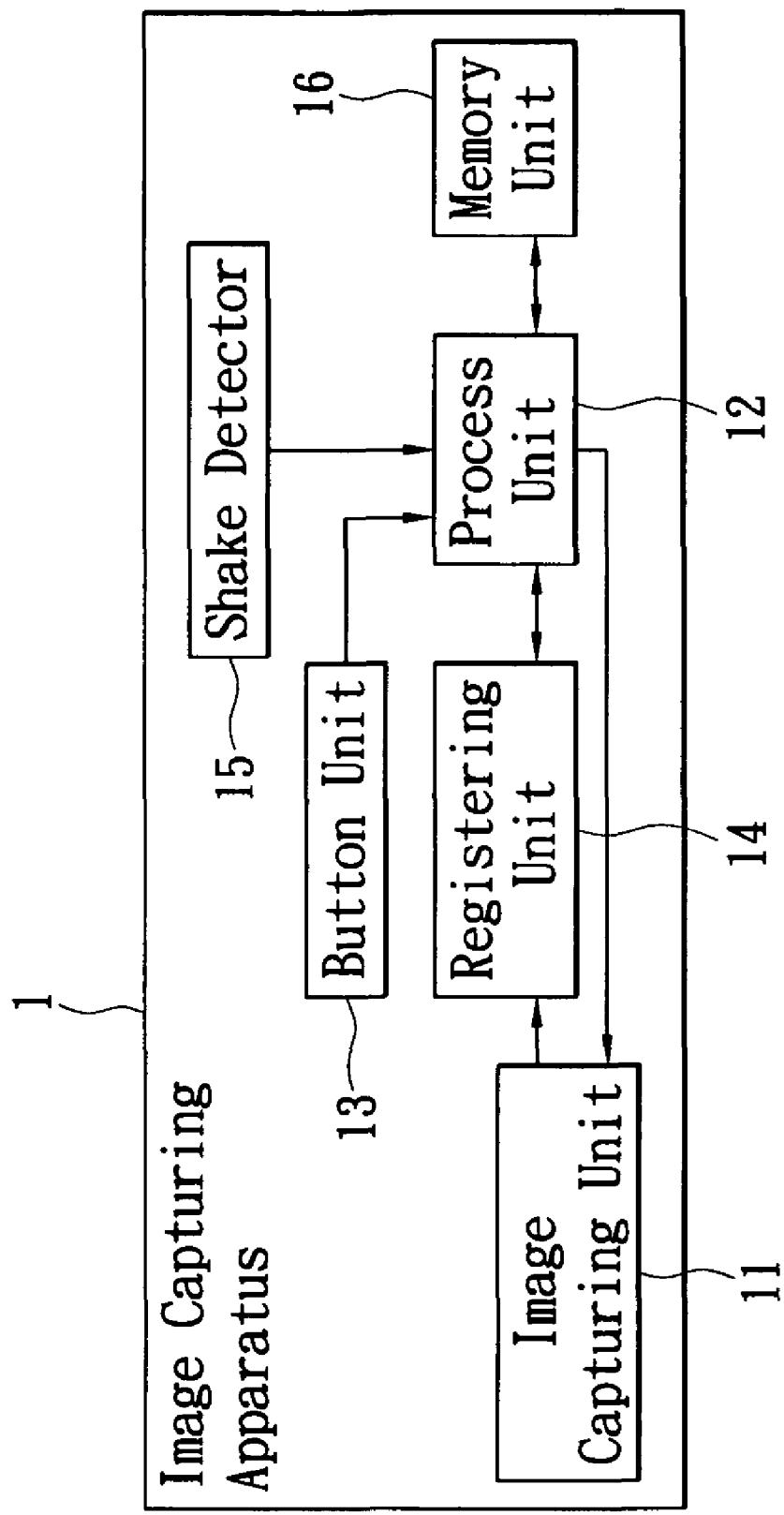
FIG. 1 shows a block diagram of an embodiment of an image capturing apparatus with image blur suppression according to the present invention.

Referring now to FIG. 1, wherein a block diagram of an embodiment of an image capturing apparatus with image blur suppression according to the present invention is shown. As illustrated, the present invention provides an image capturing apparatus 1 which consists of: an image capturing unit 11, a process unit 12, a button unit 13, a registering unit 14, a shake detector 15 and a memory unit 16. The image capturing apparatus 1 of the present invention provides a feature of automatic image blur suppression in a photography mode whose exposure time is greater than a safe exposure time, so as to produce the effect of anti-handshake during image capturing, allowing a user to obtain an image with better clearance and less noise. Herein, the so-called safe exposure time varies, based on different image capturing apparatus 1 of numerous designs, generally referring to an exposure time of 1/60 or 1/30 second. In other words, when a user chooses an exposure time greater than the safe exposure time to capture an image, it is very possible to get a blurred image affected by handshake due to longer exposure time.

Suppose that the present exposure time of the image capturing apparatus 1 is set to be greater than the safe exposure time, so when a user is taking an image, it is possible to match the condition of image blur suppression process. At this time, after the reception of a capture signal, the image capturing unit 11 automatically captures a first image with the present exposure time and a second with an exposure time smaller than or equal to the safe exposure time simultaneously in the same landscape. That is, the first image captured by the image capturing unit 11 tends to become an image blur and out of focus due to bigger exposure time and longer exposure time than the safe exposure time; whereas the second image is very likely to become an image clear and sharp but full of noise because of its smaller exposure time and shorter exposure time than the safe exposure time. Furthermore, the actual exposure time smaller than or equal to the safe exposure time may be the default setting of the image capturing apparatus 1, and may vary in accordance with the actual application design, which is not limited in the present embodiment.

The button unit 13 is connected to the process unit 12, used to receive the press action of the user for generating a trigger signal, which enables the process unit 12 to further output the capture signal after receiving the trigger signal. The registering unit 14 is connected between the image capturing unit 11 and the process unit 12, used to temporarily store the first and the second images captured by the image capturing unit 11 to enable access by the process unit 12.

The shake detector 15 is used to record a locus signal in the image capturing apparatus 1 during the exposure time of the first image, and perform estimation based on the locus signal so as to generate a Point Spread Function (PSF) to the process unit 12. Here, in terms of application design, the shake detector 15 is usually designed with a gyroscope.

The process unit 12 is mainly used to execute an arithmetic operation to smooth the second image. The said arithmetic may be for example a procedure of convolution operation, so as to reduce noises in the second image which is sharp and clear but full of noise, making the second image more smooth (at the cost of becoming less clear in image). Furthermore, the process unit 12 uses the PSF estimated from the auxiliary arithmetic of the locus signal to compare the original second image, which is clearer, with the blurrier second image after smoothing process, so as to generate a Point Scale Image for expressing the relationship between the blurred image and the clear image.

Finally, the process unit 12 performs a specific arithmetic on the first image and the Point Scale Image to restore an output image; that is, to restore the clearance of the first image originally long-exposed and blurred. And the above-mentioned specific arithmetic in the present embodiment is, for example, an operation of point-to-point multiplication in corresponding pixels between the first image and the Point Scale Image. However, before that the process unit 12 performs the specific arithmetic, it is possible to further perform a reduction procedure onto the Point Scale Image, so as to de-speckle and smooth the Point Scale Image.

The memory unit 16 is connected to the process unit 12 for storing the clearer resulting image finally output from the process unit 12. This is the final output image that the user can obtain in this image capture.

Figure 2:
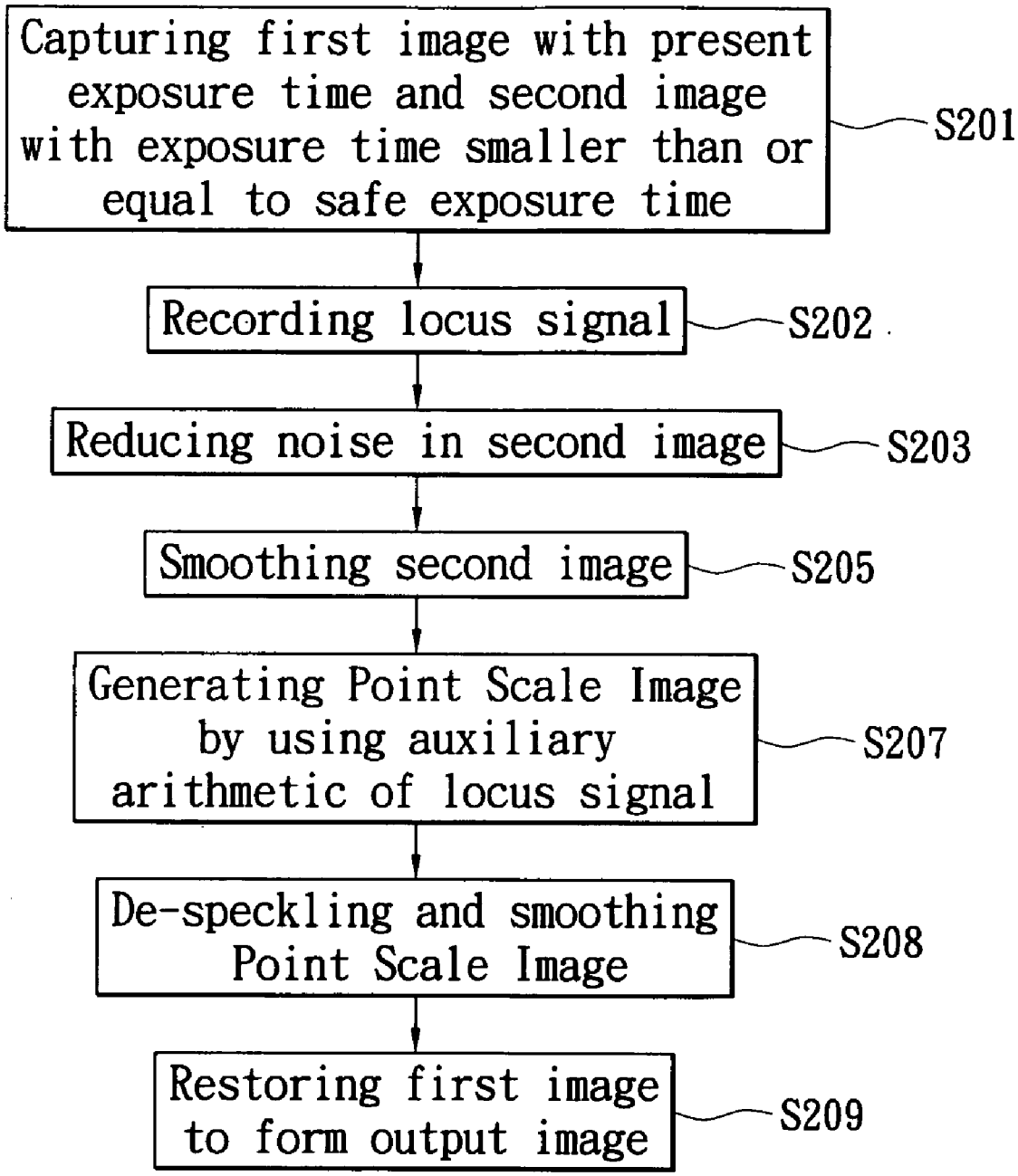
FIG. 2 shows a flowchart of a method for suppression of image blur according to the present invention.

Referring now to FIG. 2, wherein a flowchart of a method for suppression of image blur according to the present invention is shown. As shown in this Figure, the present invention provides a method for suppression of image blur, which is applied to an image capturing apparatus 1 in a photography mode whose exposure time is set to be greater than a safe exposure time, consisting of the following steps: initially, capturing a first image with the present exposure time and a second with an exposure time smaller than or equal to the safe exposure time simultaneously in the same landscape (S201). Meanwhile, record a locus signal in the image capturing apparatus 1 during the exposure time of the first image (S202). Since the second image is a sharp and clear image of short exposure and full of noise, it is hence possible to further perform a noise reduction procedure to reduce the noise in the second image (S203).

Certainly, the noise reduction procedure executed in step (S203) may be considered as a further process for noise reduction, and in actual application design it may be omitted, if desired. The reason is that, in the subsequent step, a convolution arithmetic procedure will be performed to smooth the second image (S205), and at the same time as the execution of the convolution arithmetic procedure, the effects of noise reduction and image smoothing can be achieved, which transforms the second image originally clearer and with more noise into an image blurrier but containing less noise.

Next, after the step (S205), it is possible to estimate and generate the Point Spread Function (PSF) through the auxiliary arithmetic of the recorded locus signal, and then perform the convolution arithmetic procedure for the second image (sharp image) with the obtained PSF to get a similar blur image as the first image (long exposure). The generated blurred second image is compared to its original second image, so as to generate a Point Scale Image (S207), which is used to express the relationship between the original clear image and the blurrier image. The Point Scale image was obtained by dividing the original second image by the generated blurred one point by point. Following this, in order to make the Point Scale Image become more precise, it is possible to further perform a reduction procedure to de-speckle and smooth the Point Scale Image (S208).

Hence, by means of the relationship between the clearer image and the blurrier image in the Point Scale Image, it is possible to further perform a point-to-point multiplication arithmetic in corresponding pixels between the first image and the Point Scale Image, so as to successfully restore the first image into a clear output image (S209). This is the final output image that the user can obtain in this image capture. Thereby, even the user performs an image capture in a photography mode whose exposure time is greater than the safe exposure time, the image capturing apparatus 1 may also perform image blur suppression on the first image with the assistance of the second image automatically captured, in order to achieve the objective of restoring the first image into a clearer output image.

Also, those who are skilled in the art may appreciate that, in the above-mentioned embodiments, the use of the convolution operation procedure for smoothing process, the Point Spread Function estimated and generated by the locus signal as well as the reduction procedure performed with the Point Scale Image, etc., are merely exemplary, and other strategies may by all means be employed for implementation.

In summary, the image capturing apparatus with suppression of image blur and method for suppression of image blur thereof according to the present invention essentially use long exposure image, short exposure image and estimated Point Spread Function for auxiliary comparison and arithmetic operations, thereby achieving the objective of obtaining clear image by performing image blur suppression under long exposure image capture. In addition, since in the present invention the images are captured in the same landscape but at different exposure times, available information is sufficient during image post-process stage, and the designated algorithm may be less complicated, thus it is possible restore the clearer image within short period of time, providing the advantage of anti-handshake effect improvement.

The above-mentioned descriptions present merely the illustrations and drawings of the embodiments of the present invention, without any intention to limit the present invention thereto. The scope of the present invention should be defined by the claims set out hereunder, and all equivalent changes, alternations or modifications that any one skilled in the art may intuitively conceive are hence reasonably considered to be encompassed within the scope of the present invention.

What is claimed is:

1. An image capturing apparatus with suppression of image blur, which performs image blur suppression in a photography mode whose exposure time is set to be greater than a safe exposure time, the said image capturing apparatus includes:
   an image capturing unit, which receives a capture signal to capture a first image with a present exposure time, and a second image with an exposure time being smaller than or equal to the safe exposure time;
   a shake detector, which is used to record a locus signal in the image capturing apparatus during the exposure time for the first image; and
   a process unit, which is used to generate the capture signal, execute an arithmetic procedure to smooth the second image, use the auxiliary arithmetic operation of locus signal to build a point scale image, and further perform a specific arithmetic on the first image and the Point Scale Image, so as to restore and form an output image;
   thereby, in the photography mode whose exposure time is greater than the safe exposure time, performing image blur suppression on the first image through the assistance of the second image.

2. The image capturing apparatus with suppression of image blur according to claim 1, further includes a button unit, which is connected to the process unit, and used to generate a trigger signal to cause the process unit to generate the capture signal.

3. The image capturing apparatus with suppression of image blur according to claim 1, further includes a registering unit, which is connected between the image capturing unit and the process unit, and used to temporarily store the first image and the second image for access by the process unit.

4. The image capturing apparatus with suppression of image blur according to claim 1, wherein the process unit further uses the auxiliary arithmetic of the locus signal to estimate and generate a point spread function, and compares the original second image with the smoothed second image to generate the Point Scale Image.

5. The image capturing apparatus with suppression of image blur according to claim 1, wherein the process unit further performs a reduction procedure to de-speckle and smooth the point scale image.

6. The image capturing apparatus with suppression of image blur according to claim 1, wherein arithmetic procedure is a convolution operation procedure.

7. The image capturing apparatus with suppression of image blur according to claim 1, wherein the specific arithmetic is an operation of point-to-point multiplication in corresponding pixels between the first image and the point scale image.

8. The image capturing apparatus with suppression of image blur according to claim 1, further includes a memory unit, which is connected to the process unit for storing the output image.

9. The image capturing apparatus with suppression of image blur according to claim 1, wherein the first image captured by the image capturing unit is a long exposure image being blurred and out of focus, and the second image is a short exposure image being sharp and clear image but full of noise.

10. A method for suppression of image blur, which is applied to a photography mode whose exposure time is set to be greater than a safe exposure time, the said method includes the following steps:
    capturing an image with the present exposure time, and a second image with an exposure time smaller than or equal to the safe exposure time;
    recording the locus signal in the image capturing apparatus during the exposure time for the first image;
    executing an arithmetic procedure to smooth the second image, and using the auxiliary arithmetic operation of locus signal to build a point scale image; and
    performing a specific arithmetic on the first image and the point scale image, so as to restore and form an output image,
    thereby, in the photography mode whose exposure time is greater than the safe exposure time, it is possible to perform image blur suppression on the first image through the assistance of the second image.

11. The method for suppression of image blur according to claim 10, wherein the first image captured is a long exposure image being blurred and out of focus, and the second image is a short exposure image being sharp and clear image but full of noise.

12. The method for suppression of image blur according to claim 10, wherein, after capturing the second image, further performs a noise reduction procedure, so as to reduce the noise in the second image.

13. The method for suppression of image blur according to claim 10, wherein, after the step of smoothing process, further uses the auxiliary arithmetic of the locus signal to estimate and generate a point spread function, and compares the original second image with the smoothed second image to generate the point scale image.

14. The method for suppression of image blur according to claim 10, wherein, after generation of the point scale image, further performs a reduction procedure to de-speckle and smooth the point scale image.

15. The method for suppression of image blur according to claim 10, wherein arithmetic procedure is a convolution operation procedure.

16. The method for suppression of image blur according to claim 10, wherein the specific arithmetic is an operation of point-to-point multiplication in corresponding pixels between the first image and the point scale image.

* * * * *